(12) United States Patent
Li et al.

(10) Patent No.: US 8,635,010 B2
(45) Date of Patent: Jan. 21, 2014

(54) NAVIGATION SYSTEM WITH ACCESSORY CONTROL MECHANISM AND METHOD OF OPERATION THEREOF

(75) Inventors: Hanhong Li, Cupertino, CA (US); MinhHung Canh Nguyen, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 387 days.

(21) Appl. No.: 13/028,084

(22) Filed: Feb. 15, 2011

(65) Prior Publication Data

US 2012/0209517 A1 Aug. 16, 2012

(51) Int. Cl.
*G01C 21/00* (2006.01)

(52) U.S. Cl.
USPC ............ 701/201; 701/36; 701/400; 701/514; 701/523; 701/300; 701/302; 362/37; 362/464

(58) Field of Classification Search
None
See application file for complete search history.

(56) References Cited

U.S. PATENT DOCUMENTS

| | | | |
|---|---|---|---|
| 5,249,083 A | 9/1993 | Doughtie et al. | |
| 6,010,237 A * | 1/2000 | Gotou | 362/460 |
| 6,049,749 A * | 4/2000 | Kobayashi | 701/49 |
| 6,293,686 B1 * | 9/2001 | Hayami et al. | 362/465 |
| 6,343,869 B1 * | 2/2002 | Kobayashi | 362/37 |
| 6,390,631 B1 | 5/2002 | Lang et al. | |
| 6,459,387 B1 * | 10/2002 | Kobayashi et al. | 340/988 |
| 6,481,865 B2 | 11/2002 | Woerner et al. | |
| 6,600,986 B2 * | 7/2003 | Steinle et al. | 701/70 |
| 6,626,564 B2 * | 9/2003 | Horii et al. | 362/466 |
| 6,672,728 B1 | 1/2004 | Su et al. | |
| 6,755,560 B2 * | 6/2004 | Horii | 362/466 |
| 6,756,888 B2 | 6/2004 | Su et al. | |
| 6,853,906 B1 * | 2/2005 | Michi et al. | 701/521 |
| 6,984,059 B2 * | 1/2006 | Ishiguro et al. | 362/465 |
| 7,131,741 B2 | 11/2006 | Sugimoto et al. | |
| 7,150,547 B2 * | 12/2006 | Okawa | 362/465 |
| 7,156,542 B2 | 1/2007 | Miller et al. | |
| 7,188,979 B2 | 3/2007 | Hasegawa | |
| 7,241,034 B2 * | 7/2007 | Smith et al. | 362/465 |
| 7,429,120 B2 * | 9/2008 | Sugimoto | 362/466 |
| 7,429,825 B2 | 9/2008 | Kubota et al. | |
| 7,611,266 B2 * | 11/2009 | Ibrahim et al. | 362/464 |
| 7,791,459 B2 * | 9/2010 | Teramura et al. | 340/438 |
| 7,792,621 B2 * | 9/2010 | Sugimoto et al. | 701/49 |
| 8,370,028 B2 * | 2/2013 | Yamada | 701/49 |
| 2002/0080617 A1 * | 6/2002 | Niwa et al. | 362/465 |
| 2002/0080618 A1 * | 6/2002 | Kobayashi et al. | 362/466 |
| 2003/0031008 A1 * | 2/2003 | Kobayashi | 362/37 |
| 2004/0212484 A1 | 10/2004 | Su et al. | |
| 2005/0027419 A1 * | 2/2005 | Horii et al. | 701/49 |
| 2005/0157509 A1 * | 7/2005 | Tsukamoto | 362/465 |
| 2005/0253738 A1 * | 11/2005 | Kobayashi et al. | 340/988 |
| 2006/0028832 A1 * | 2/2006 | Horii et al. | 362/514 |
| 2006/0291228 A1 * | 12/2006 | Mizuno et al. | 362/509 |
| 2007/0198177 A1 * | 8/2007 | Yamada | 701/208 |
| 2008/0077882 A1 * | 3/2008 | Kramer et al. | 715/810 |

(Continued)

*Primary Examiner* — Jonathan M Dager
(74) *Attorney, Agent, or Firm* — IP Investment Law Group (57) ABSTRACT

A method of operation of a navigation system includes: obtaining a device state having a current location, a current speed, and a current heading for locating a device; identifying an anticipated maneuver point for estimating a future location of the device on a thoroughfare with the anticipated maneuver point calculated from the current location and the current heading; determining an expected maneuver at the anticipated maneuver point; and generating an accessory control for manipulating an accessory on the device for the expected maneuver at the anticipated maneuver point.

20 Claims, 6 Drawing Sheets

(56) References Cited

U.S. PATENT DOCUMENTS

| | | | |
|---|---|---|---|
| 2008/0262681 A1* | 10/2008 | Morishita et al. | 701/49 |
| 2009/0005929 A1* | 1/2009 | Nakao et al. | 701/35 |
| 2009/0043458 A1* | 2/2009 | Kamioka et al. | 701/49 |
| 2010/0049437 A1* | 2/2010 | Hu et al. | 701/213 |
| 2010/0188864 A1* | 7/2010 | Raghunathan et al. | 362/466 |
| 2010/0292886 A1* | 11/2010 | Szczerba et al. | 701/29 |

* cited by examiner

NAVIGATION SYSTEM WITH ACCESSORY CONTROL MECHANISM AND METHOD OF OPERATION THEREOF

TECHNICAL FIELD

The present invention relates generally to a navigation system, and more particularly to a system with location-based services.

BACKGROUND ART

Modern portable consumer and industrial electronics provide increasing levels of functionality to support modern life including telecommunications and location-based information services. This is especially true for client devices such as navigation systems, cellular phones, portable digital assistants, and multifunction devices.

As users adopt mobile location based service devices, new and old usage begin to take advantage of this new device space. There are many solutions to take advantage of this new device opportunity. One existing approach is to use location information to provide navigation services, such as a global positioning service (GPS) navigation system for a mobile device.

Navigation system and service providers are continually making improvement in the user's experience in order to be competitive. Systems can display map information, navigate and display a route between two points, and enable other services on these devices. Positioning systems have the ability to locate a device with a degree of accuracy, such as within a few hundred meters. Also, systems can operate different positioning functions to identify their location.

However, increasing demand from consumers is forcing the pace of development in this area. As this demand increases and commercial pressures grow, systems are required to provide more and more functionality with timely and accurate responsiveness and improved reliability.

Thus, a need still remains for a navigation system with improvement in usability, functionality, performance, and accuracy. In view of the expanding importance of navigation systems in modern life, it is increasingly critical that answers be found to these problems. Additionally, the need to reduce costs, improve efficiencies and performance, while meeting competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: obtaining a device state having a current location, a current speed, and a current heading for locating a device; identifying an anticipated maneuver point for estimating a future location of the device on a thoroughfare with the anticipated maneuver point calculated from the current location and the current heading; determining an expected maneuver at the anticipated maneuver point; and generating an accessory control for manipulating an accessory on the device for the expected maneuver at the anticipated maneuver point.

The present invention provides a navigation system, including: a location module for obtaining a device state having a current location, a current speed, and a current heading for locating a device; a next point module, coupled to the location module, for identifying an anticipated maneuver point for estimating a future location of the device on a thoroughfare with the anticipated maneuver point calculated from the current location and the current heading; a next action module, coupled to the next point module, for determining an expected maneuver at the anticipated maneuver point; and a manipulation module, coupled to the next action module, for generating an accessory control for manipulating an accessory on the device for the expected maneuver at the anticipated maneuver point.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
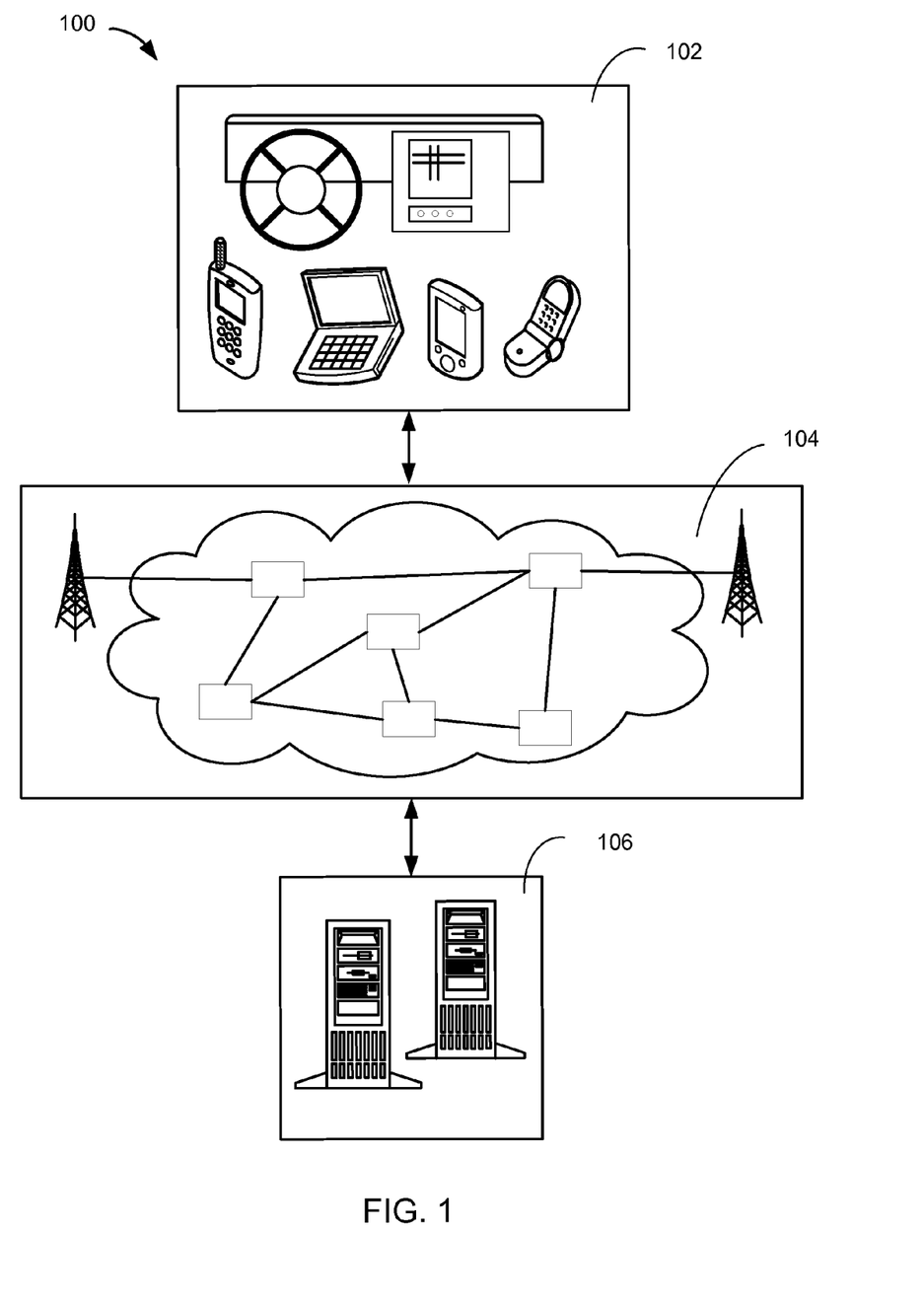
FIG. 1 is a navigation system with accessory control mechanism in an embodiment of the present invention.

Referring now to FIG. 1, therein is shown a navigation system 100 with accessory control mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
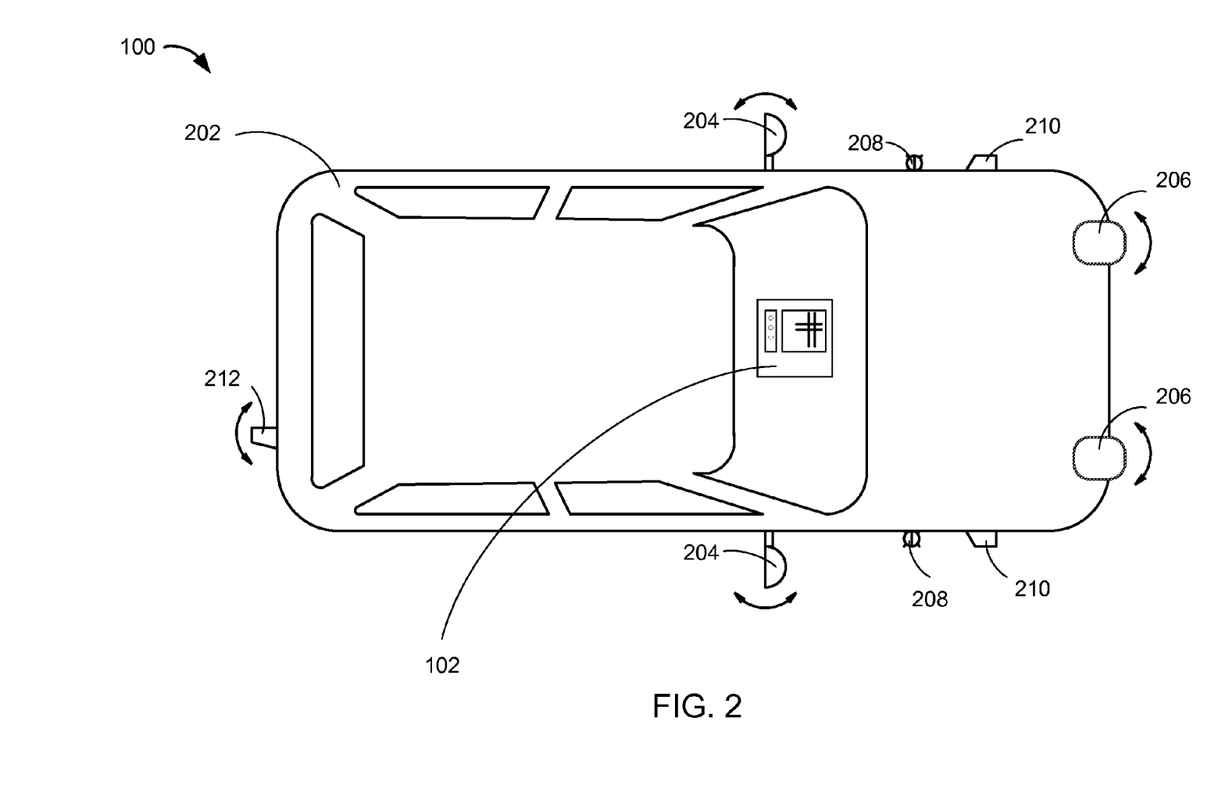
FIG. 2 is an example application of the navigation system.

Referring now to FIG. 2, therein is shown an example application of the navigation system 100. The illustration shows the navigation system 100 with a vehicle 202 viewed from above. The vehicle 202 is illustrated as a car, although the vehicle 202 could also be described as a bus, truck, train, or other form of transportation. In this example application, the vehicle 202 is shown with the first device 102 incorporated with the vehicle 202, as previously described. The first device 102 is shown mounted on the dashboard of the vehicle 202.

The vehicle 202 is shown with two instances of a mirror 204. In this illustration, the mirror 204 is shown as a side-mirror. As is typical on modern production motor vehicles, the vehicle 202 is shown with the two instances of the mirror 204 as a pair of side-mirrors. One instance of the mirror 204 is mounted on the left side of the vehicle 202, and the other instance is mounted on the right side of the vehicle 202. Other examples of the mirror 204 can include an internal rearview mirror (not shown) mounted inside the vehicle 202.

Each instance of the mirror 204 can swivel as indicated by arrows in the illustration. For example, the mirror 204 can swivel horizontally independent of another of the mirror 204 as indicated by the arrows. Each instance of the mirrors 204 can also tilt vertically (not shown) independent of another of the mirror 204. The movement of the mirror 204, horizontally or vertically, can alter the area visible in the mirror 204 to a user of the navigation system 100, such as a driver of the vehicle 202.

The vehicle 202 is also shown with two instances of a headlight 206 mounted on the front of the vehicle 202, as is typical on modern production motor vehicles. One instance of the headlight 206 is mounted to the front-left of the vehicle 202, and the other instance is mounted to the front-right of the vehicle 202.

Each instance of the headlight 206 can move as indicated by arrows in the illustration. For example, the headlight 206 can swivel horizontally independent of another of the headlight 206 as indicated by the arrows in the illustration. Each instance of the headlight 206 can also tilt vertically up or down (not shown) independent of another of the headlight 206.

The movement of the headlight 206 can alter an area in front of the vehicle 202 illuminated by the headlight 206. For example, if the headlights 206 in the illustration swivel to the left, the area illuminated by the headlights 206 shifts to the left. As a further example, if the headlights 206 tilt up or down, the area illuminated by the headlights 206 moves further from, or closer to, the vehicle 202.

The vehicle is also shown with two instances of a turn signal 208. The turn signal 208 is defined as an indicator light, whose operation can indicate an intention to make a lateral movement. Examples of the vehicle 202 making a lateral movement include turning a corner, or switching to a different lane. As an example of the turn signal 208, in modern production motor vehicles, the turn signal 208 is implemented as a flashing light. In the illustration, one instance of the turn signal 208 is mounted on the left side of the vehicle 202, and another instance of the turn signal 208 is mounted on the right side of the vehicle 202. The turn signal 208 can be implemented in other ways, for example appended to the mirror 204, adjacent to the headlight 206, at the rear of the vehicle 202, or a combination thereof.

The vehicle 202 is also shown with two instances of a sidelight 210, mounted on the left and right sides of the vehicle 202 respectively. The sidelight 210 functions as a visual aid to a driver of the vehicle 202, which can illuminate the intended direction of the vehicle 202. For example, for an intended left turn by the vehicle 202, the sidelight 210 on the left side of the vehicle 202 can light up to enhance the view of the desired path.

The vehicle 202 is also shown with a camera 212 mounted on the rear of the vehicle 202. The camera 212 functions as a visual aid to provide a view to the rear of the vehicle 202. The images captured by the camera 212 can be displayed on a display mounted on the dashboard of the vehicle 202. Example applications include providing a view of an obstruction to the rear of the vehicle 202 when parallel-parking on a street, and other maneuvers requiring awareness of an obstruction to the rear of the vehicle 202.

As will be described, the navigation system 100 can provide the intelligence to manipulate accessory controls to adjust an accessory such as the mirror 204, the headlight 206, the turn signal 208, the sidelight 210, the camera 212, or a combination thereof.

Figure 3:
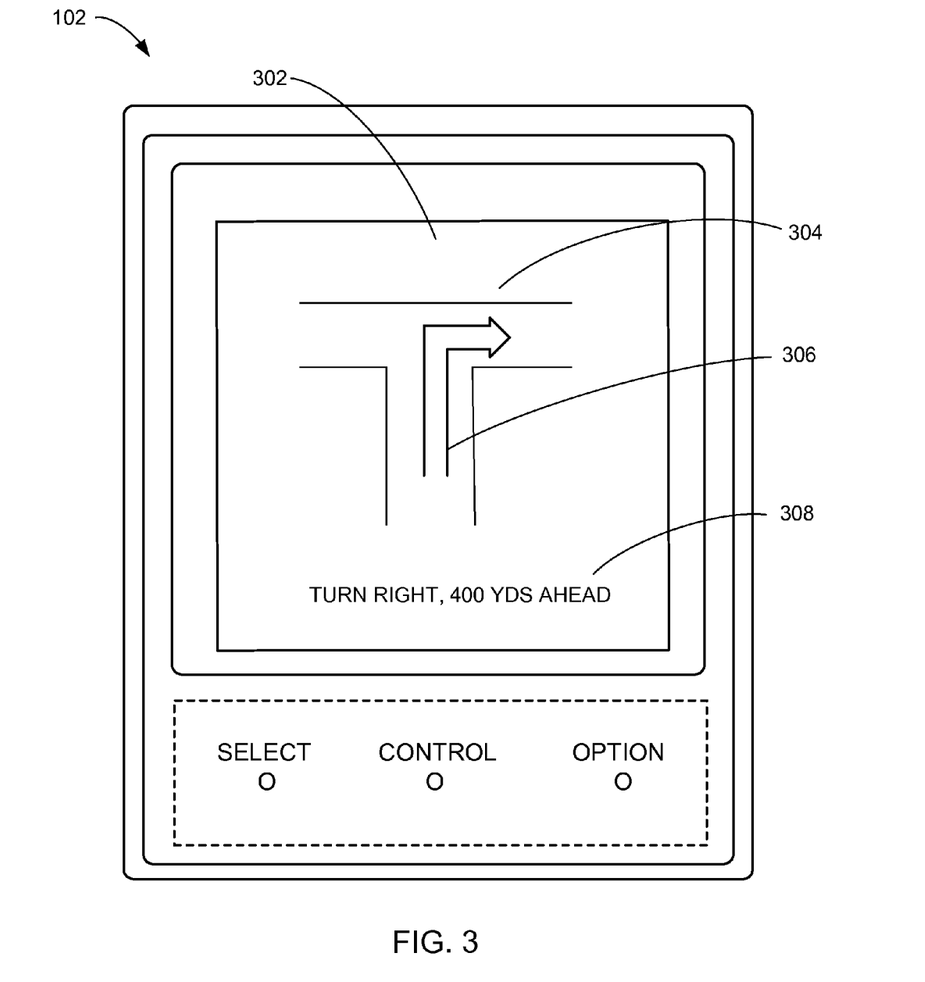
FIG. 3 is a display interface of the first device.

Referring now to FIG. 3, therein is shown a display interface 302 of the first device 102. The display interface 302 is a module or device, which presents information provided or retrieved by the navigation system 100 of FIG. 1. The illustration shows the display interface 302 with a visual display of relevant information for the benefit of a user of the navigation system 100. In this example, the display interface 302 can be implemented in the first device 102 in the vehicle 202 of FIG. 2.

The illustration shows a representation on the display interface 302 of an intersection 304 of two thoroughfares. In particular, the intersection 304 is in the form of a T-junction, wherein one of the intersecting thoroughfares ends at the intersection 304.

The illustration also shows an overlay 306 at the intersection 304 displayed on the display interface 302. The overlay 306 is defined as a visual enhancement of the relevant information for a user of the navigation system 100 to be used for traversing a planned route (not shown) generated by the navigation system 100. For example, the overlay 306 is shown as an arrow indicating a recommended maneuver or direction of travel of the first device 102 as it approaches the intersection 304 following the planned route. In this example, the planned route can include a right turn, indicated by the overlay 306. The relevant information can be further enhanced by a navigation guidance 308, which is an instruction for following the planned route.

Figure 4:
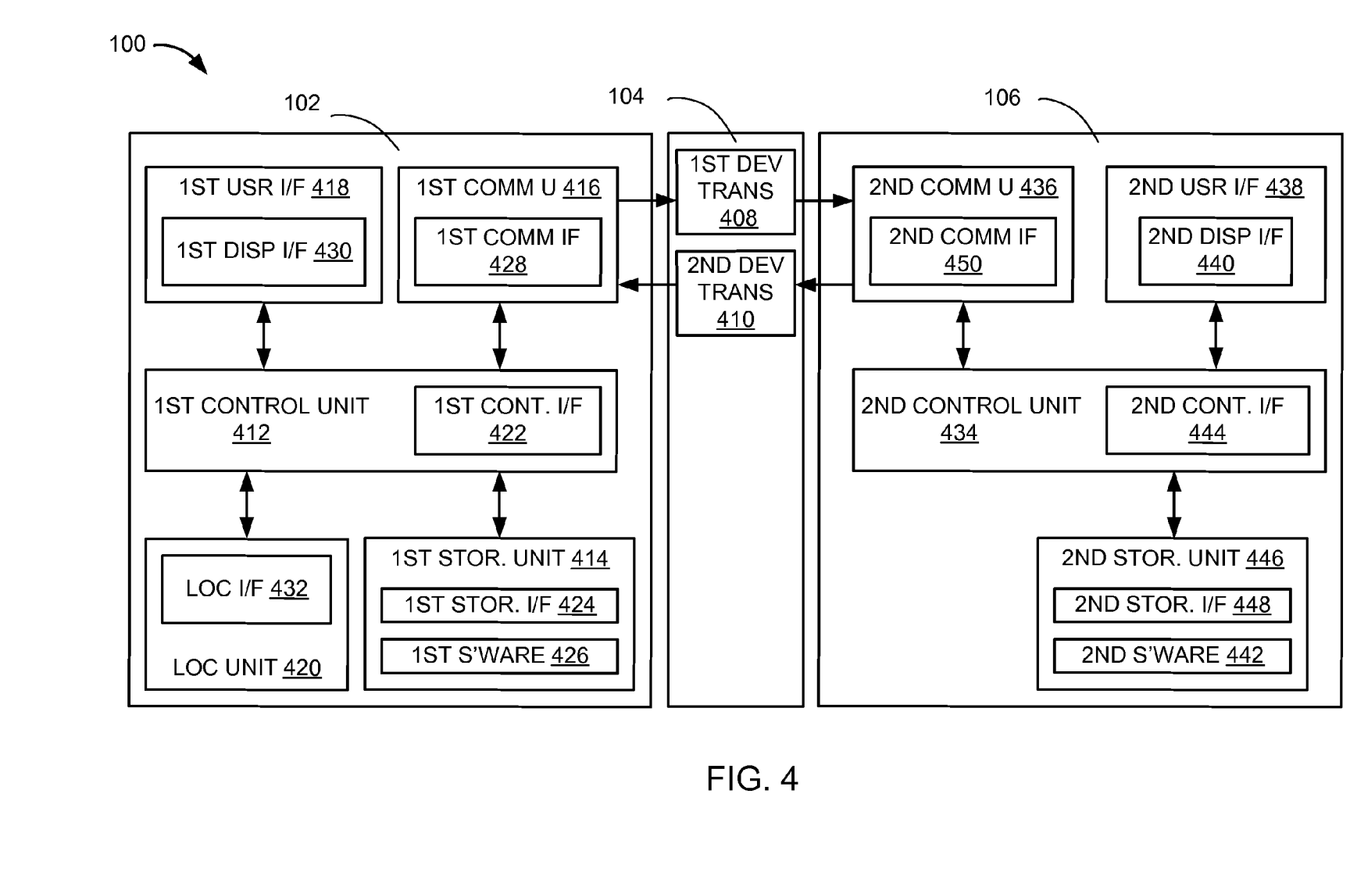
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention. The first device 102 can include a first control unit 412, a first storage unit 414, a first communication unit 416, a first user interface 418, and a location unit 420.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as nonvolatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as nonvolatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
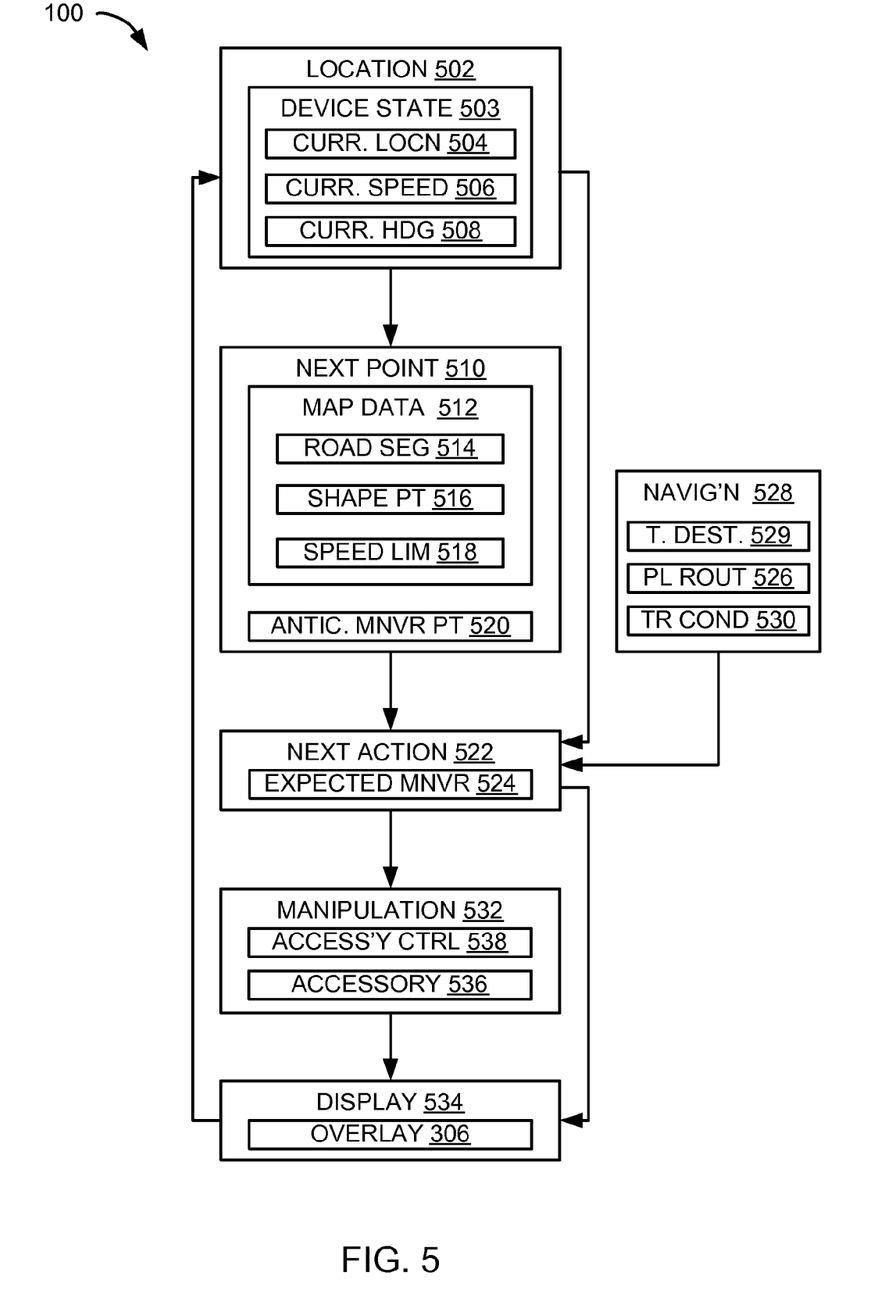
FIG. 5 is a control flow of the navigation system.

Referring now to FIG. 5, therein is shown a control flow of the navigation system 100. As an example, the navigation system 100 can be operated by running the first software 426 of FIG. 4, the second software 442 of FIG. 4, or a combination thereof.

The navigation system 100 can include a location module 502. The location module 502 receives, extracts, or calculates current information of the first device 102 of FIG. 4 including location, speed, and heading. The location module 502 can obtain a device state 503 having a current location 504, a current speed 506, and a current heading 508 for locating the first device 102.

The device state 503 is information related to a device for navigation purposes. The device state 503 can include the current location 504, the current speed 506, and the current heading 508 of the first device 102. The device state 503 can also include other information related to the first device 102, such as identifying the location of the first device 102 in a garage at a residence, or in a workplace garage. As a further example, the device state 503 can include a status to denote a vehicle, such as the vehicle 202 of FIG. 2 with the first device 102, starting up, or shutting down.

The current location 504 is defined as the geographic location of the first device 102, and can be expressed as location coordinates, a street address, an intersection of thoroughfares, or a combination thereof. As an example, the location module 502 can obtain the current location 504 from a GPS, an inertial navigation system, a cellular-tower location system, a pressure location system, or any combination thereof.

The current speed 506 is defined as a rate of travel of a device such as the first device 102. The current speed 506 can be measured by a variety of instruments or techniques. As an example of obtaining the current speed 506, a speedometer in a car can measure the current speed 506 of the car by gauging the rate of rotation of a wheel.

The current heading 508 is defined as a direction of travel of a device such as the first device 102. As an example, the location module 502 can obtain the current heading 508 by comparing the current location 504 with a previous version of the current location 504. As a further example, the location module 502 can operate a compass to obtain the current heading 508.

As an example implementation, the location module 502 can be implemented with the navigation system 100. The location module 502 can be implemented with the location unit 420 of FIG. 4, the first software 426 of FIG. 4, or a combination thereof.

The location module 502 can send the device state 503 having the current location 504, the current speed 506, and the current heading 508 to a next point module 510. The next point module 510 identifies or estimates a shape point or location on a thoroughfare, which the navigation system 100 will encounter.

A shape point is defined as a geographic location stored in a navigation database, which identifies an inflection point or end point on a thoroughfare or road segment. For example, a curved road segment can be defined in a navigation database by shape points defining the curvature of the road segment. As a further example, a shape point can identify the beginning or the end of an incline on a thoroughfare.

Shape points can also be used to define other navigation-related or traffic-related locations. Further examples of shape points can include an intersection of two or more thoroughfares, a point on a thoroughfare where a new speed limit is imposed, and a point where a thoroughfare narrows or widens.

Navigation databases can include map information in which a network of thoroughfares is described by shape points connected by road segments corresponding to thoroughfares in the area covered by the map information. Location-based systems with access to a navigation database can plan a route between two locations by selecting a succession of road segments, which connects the start, and end points of the desired route. Each successive pair of road segments along the route is joined at a shape point.

The next point module 510 can also receive or access map data 512 from another module or unit of the navigation system 100, such as the first storage unit 414 of FIG. 4, the second storage unit 446 of FIG. 4, or a combination thereof. The map data 512 is a navigation database of relevant information relating to a predefined geographic region, which can include feature information or a road network, from which a navigable route between two locations can be selected, as previously described.

The map data 512 can include a road segment 514, which is defined as a representation in the map data 512 of a portion of a thoroughfare. The map data 512 can also include a shape point 516, previously described, which is a point of inflection or an end point of the road segment 514. The map data 512 can also include other navigation-related information, such as a speed limit 518 associated with the road segment 514. The speed limit 518 is an administrative restriction on the pace of vehicular traffic along a portion of a thoroughfare, the road segment 514 in this example.

The next point module 510 can compare the current location 504 with the network of thoroughfares in the map data 512, and can identify the road segment 514, which includes the current location 504. The next point module 510 can also compare the current heading 508 with the current location 504 on the road segment 514 to determine the direction of travel along the road segment 514.

The next point module 510 can couple to the location module to identify an anticipated maneuver point 520 for estimating a future location of the device on a thoroughfare with the anticipated maneuver point calculated from the current location 504 and the current heading 508. The anticipated maneuver point 520 is defined as the next of the shape point 516, which will be encountered, derived from the current location 504 on the road segment 514 in the direction of the current heading 508.

The next point module 510 can identify the anticipated maneuver point 520 on the road segment 514 in a direction of the current heading 508 from the current location 504. Identifying the anticipated maneuver point 520 means that from the position of the current location 504 on the road segment 514 and having the current heading 508, the next point module 510 can extrapolate along the road segment 514 to the next instance of the shape point 516 on the road segment 514. The shape point 516 is the next such point, which the navigation system 100 will encounter. The next point module 510 can assign the shape point 516 as the anticipated maneuver point 520.

As an example implementation, the next point module 510 can be implemented with the navigation system 100. The next point module 510 can be implemented with the first control unit 412 of FIG. 4 coupled to the first storage unit 414, the first software 426, the second control unit 434 coupled to the second storage unit 446, the second software 442, or a combination thereof.

The next point module 510 can send the anticipated maneuver point 520 to a next action module 522. The purpose of the next action module 522 is to determine a maneuver by a device to coincide with its arrival at the anticipated maneuver point 520. For a number of possible such maneuvers, the next action module 522 can select the most likely maneuver.

The next action module 522 can also receive the current location 504 and the current speed 506 from the location module 502. The next action module 522 can determine an expected maneuver 524 at the anticipated maneuver point 520. The expected maneuver 524 is a maneuver by a device such as the first device 102 at the anticipated maneuver point 520 required to sustain progress along a thoroughfare.

Examples of the expected maneuver 524 include a left turn, a right turn, and a U-turn when the anticipated maneuver point 520 represents a turn or an intersection. Further examples of the expected maneuver 524 include starting or finishing a slope, the slope being upwards or downwards.

Determining the expected maneuver 524 means the next action module 522 can calculate the time until an arrival at the anticipated maneuver point 520. Determining the expected maneuver 524 also means determining the nature of the maneuver at the anticipated maneuver point 520.

The next action module 522 can estimate the arrival at the anticipated maneuver point 520 calculated with the current location 504 and the current speed 506. The next action module 522 can determine the distance from the current location 504 to the anticipated maneuver point 520, and divide the distance by the current speed 506. The resulting value is the time required to reach the anticipated maneuver point 520.

The next action module 522 can also identify a further road segment 514 connected to the anticipated maneuver point 520 with a further current heading 508. The next action module 522 can query the map data 512 to determine whether the further road segment 514 is connected to the anticipated maneuver point 520. The next action module 522 can select the expected maneuver 524 based on the further road segment 514, such that the expected maneuver 524 can enable the device to follow the further road segment 514 after negotiating the anticipated maneuver point 520.

The next action module 522 can select the further road segment 514 based on a predetermined criterion. For example, for the anticipated maneuver point 520 connected to a number of road segments 516. The next action module 522 can select the further road segment 514, which provides the straightest path from the current location 504. As another example, the next action module 522 can select the further road segment 514, which follows a major route.

For example, if the anticipated maneuver point 520 is an intersection of two thoroughfares, the expected maneuver 524 can include a left turn, a right turn, or continuing straight ahead. As a further example, if the anticipated maneuver point 520 is the start of an incline or decline, the expected maneuver 524 can include continuing straight ahead with an ascent or descent to account for the slope.

The arrival of the device at the anticipated maneuver point 520 can also depend on the speed limit 518 associated with the road segment 514. For example, the next action module 522 can calculate the arrival at the anticipated maneuver point 520 based on the speed limit 518 of the road segment 514, and the distance from the current location 504 to the anticipated maneuver point 520.

The next action module 522 can also receive a planned route 526 from a navigation module 528. The purpose of the navigation module 528 is to generate or select relevant information related to traffic or roads. The navigation module 528 can access the map data 512 to retrieve map-based information. The navigation module 528 can also obtain real-time information relating to traffic, such as the location and impact of roadworks, traffic congestion, weather conditions, or traffic accidents, as examples.

The planned route 526 is defined as a selected sequence of road segments, such as the road segment 514, from a starting location to a target destination 529, as described previously. The target destination 529 can be the intended end point of a journey beginning at a starting location. As examples, the starting location and the target destination 529 can be described by a street address, location coordinates, an intersection of thoroughfares, or as a landmark. The navigation module 528 can select the planned route 526 beginning at the starting location and leading to the target destination 529 along a sequence of road segments, such as the road segment 514, and leading to the target destination 529.

The navigation module 528 can couple to the next action module 522 to generate the planned route 526 to the target destination 529 for navigating a device such as the first device 102, by selecting the sequence of road segments from the starting location to the target destination 529. As an example application, a user can request the planned route 526 from the current location 504 to a home address as the target destination 529.

The next action module 522 can receive the planned route 526 from the navigation module 528. The next action module 522 can identify the anticipated maneuver point 520 on the planned route 526. The next action module 522 can determine the expected maneuver 524 at the anticipated maneuver point 520 consistent with the planned route 526, which means that the expected maneuver 524 is one which causes the device to continue along the planned route 526.

The next action module 522 can also receive a traffic condition 530 associated with the road segment 514 from the navigation module 528. The traffic condition 530 is defined as information about events or circumstances impacting traffic flow on a thoroughfare. The traffic condition 530 can influence the expected maneuver 524, for example, by providing additional information, which can modify the expected arrival of the first device 102 at the anticipated maneuver point 520.

Examples of the information in the traffic condition 530 include weather conditions, prevailing traffic speed, road accidents, and construction work. If the traffic condition 530 includes a prevailing traffic speed, which is different to the speed limit 518, the next action module 522 can anticipate the arrival at the anticipated maneuver point 520 based on the current location 504 and the traffic condition 530.

The navigation module 528 can obtain the traffic condition 530 associated with the road segment 514, and send the traffic condition 530 to the next action module 522. The next action module 522 can estimate the arrival at the anticipated maneuver point 520 calculated with the current location 504, the current speed 506, and the traffic condition 530. For example, if the traffic condition 530 includes a slowdown on the road segment 514, the next action module 522 can calculate the arrival at the anticipated maneuver point 520 using the speed given in the traffic condition 530 rather than the current speed 506. In this example, the first device 102 will be forced to reduce the current speed 506 until it matches the prevailing speed given in the traffic condition 530 for as long as it is on the road segment 514.

As an example implementation, the next action module 522 can be implemented with the navigation system 100. The next action module 522 can be implemented with the first control unit 412 coupled to the first storage unit 414, the first software 426, the second control unit 434 coupled to the second storage unit 446, the second software 442, or a combination thereof.

The next action module 522 can send the expected maneuver 524 to a manipulation module 532. The next action module 522 can also send the expected maneuver 524 to a display module 534, described later.

The purpose of the manipulation module 532 is to generate a control to manipulate an accessory 536 in response to the expected maneuver 524 by the device. The accessory 536 is an object or implement, which provides additional functionality to a device or entity, of which the accessory 536 is a part. In the example of the vehicle 202 of FIG. 2, the vehicle 202 can be the device or entity, and the accessory 536 can be the mirror 204 of FIG. 2, the headlight 206 of FIG. 2, the turn signal 208 of FIG. 2, the sidelight 210 of FIG. 2, or the camera 212 of FIG. 2.

The manipulation module 532 can couple to the next action module 522 to generate an accessory control 538 for manipulating the accessory 536 on a device such as the first device 102 for the expected maneuver 524 at the anticipated maneuver point 520. The manipulation module 532 can schedule the accessory control 538 to coincide with the expected maneuver 524. The manipulation module 532 can generate the accessory control 538 depending on the expected maneuver.

For example, if the first device 102 is following the planned route 526, which includes a turn at an upcoming junction, the next action module 522 can determine that the expected maneuver 524 is a turn. The manipulation module 532 can generate the accessory control 538 several seconds before arriving at the anticipated maneuver point 520 to instruct the turn signal 208 on the left of the vehicle 202 to activate.

The timing of the accessory control 538 can depend on the rate of approach to the anticipated maneuver point 520. The timing can be precomputed for multiple and sequential occurrences of the anticipated maneuver point 520. For example, the anticipated maneuver point 520 can be a right curve immediately followed by another of the anticipated maneuver point 520 for a left curve for an S-type curvature.

Upon arrival at the anticipated maneuver point 520, the manipulation module 532 can generate another of the accessory control 538 to instruct the headlight 206 to swivel horizontally in the direction of the turn, and also to instruct the mirror 204 to swivel horizontally towards the left. When the expected maneuver 524 has been completed, the manipulation module 532 can cancel the turn signal 208 and swivel the headlight 206 and the mirror 204 back to their default position.

As another example, if the first device 102 approaches a hill, the next action module 522 can determine the expected maneuver 524 is a change in slope. The manipulation module 532 can generate the accessory control 538 to instruct the headlight 206 to tilt vertically. The instruction can be an upward tilt or a downward tilt, depending on whether the change in slope is uphill or downhill.

Other examples of the manipulation module 532 generating the accessory control 538 include operating the sidelight 210 while negotiating a sharp turn, or directing the camera 212 when the vehicle 202 is reversing in a parking maneuver. Another example of the manipulation module 532 manipulating the accessory 536 includes turning on or off the accessory 536, such as the turn signal 208, the sidelight 210, the headlight 206, or the camera 212.

As an example implementation, the manipulation module 532 can be implemented with the navigation system 100. The manipulation module 532 can be implemented with the first control unit 412 coupled to the first communication unit 416 of FIG. 4, the first software 426, the second control unit 434 coupled to the second communication unit 436 of FIG. 4, the second software 442, or a combination thereof.

From the manipulation module 532, the navigation system 100 can move to the display module 534. The purpose of the display module 534 is to generate an enhanced representation of the expected maneuver 524 to present on a display element.

The display module 534 can receive the expected maneuver 524 from the next action module 522. The display module 534 can generate the overlay 306 associated with the expected maneuver 524 on a device such as the first device 102, as described previously. Generating the overlay 306 means constructing a representation of the expected maneuver 524. The display module 534 can also present the overlay 306 on a display. The illustration in FIG. 3 includes an example of the overlay 306 presented on the display interface 302 of FIG. 3 as the vehicle 202 approaches an intersection, where the expected maneuver 524 includes a right turn.

The overlay 306 can assume a variety of forms. Examples of the overlay 306 include a visual representation, an audio representation, or a combination thereof. In the example of FIG. 2, the overlay 306 is shown in a visual form with an arrow superimposed on a roadmap to denote the direction of travel. As an example of an audio form, the overlay 306 can include a synthesized voice instruction.

The display module 534 can revise the overlay 306 as the expected maneuver 524 is updated by the next action module 522 and received by the display module 534. From the display module 534, the control flow of the navigation system 100 can return to the location module 502.

As an example implementation, the display module 534 can be implemented with the navigation system 100. The display module 534 can be implemented with the first control unit 412 coupled to the first user interface 418 of FIG. 4, the first software 426, the second control unit 434 coupled to the second user interface 438 of FIG. 4, the second software 442, or a combination thereof.

The navigation system 100 can be partitioned between the first device 102 and the second device 106. For example, the navigation system 100 can be partitioned into the functional units of the first device 102, the second device 106, or a combination thereof. The navigation system 100 can also be implemented as additional functional units in the first device 102, the second device 106, or a combination thereof.

It has been discovered that the navigation system 100 can enable the integration of location-based functionality and control of one or more of the accessory 536 in a device such as the first device 102. The navigation system 100 can generate the accessory control 538 to manipulate the accessory 536, and display the overlay 306 to enhance the information provided to a user of the navigation system 100. The navigation system 100 can execute the described manipulations based on the traffic condition 530, the speed limit 518, or the current speed 506.

It has also been discovered that the navigation system 100 can improve safety for a user of the navigation system 100. For example, for a user driving the vehicle 202 with the navigation system 100, generating the accessory control 538 to manipulate the turn signal 208 can make other drivers aware of the user's intent to change lane or turn a corner. As the navigation system 100 can generate the accessory control 538 for one or more of the accessory 536 without requiring involvement of the user, the user's safety can be improved.

The physical transformation of the device state 503 having the current location 504, the current speed 506, and the current heading 508 into the accessory control 538 results in movement in the physical world, such as people using the first device 102, or vehicles, based on the operation of the navigation system 100. As the movement in the physical world occurs, the movement itself creates additional information that is converted back to the generation of the accessory control 538 for the continued operation of the navigation system 100 and to continue the movement in the physical world.

The navigation system 100 describes the module functions or order as an example. The modules can be partitioned differently. Each of the modules can operate individually and independently of the other modules.

Figure 6:
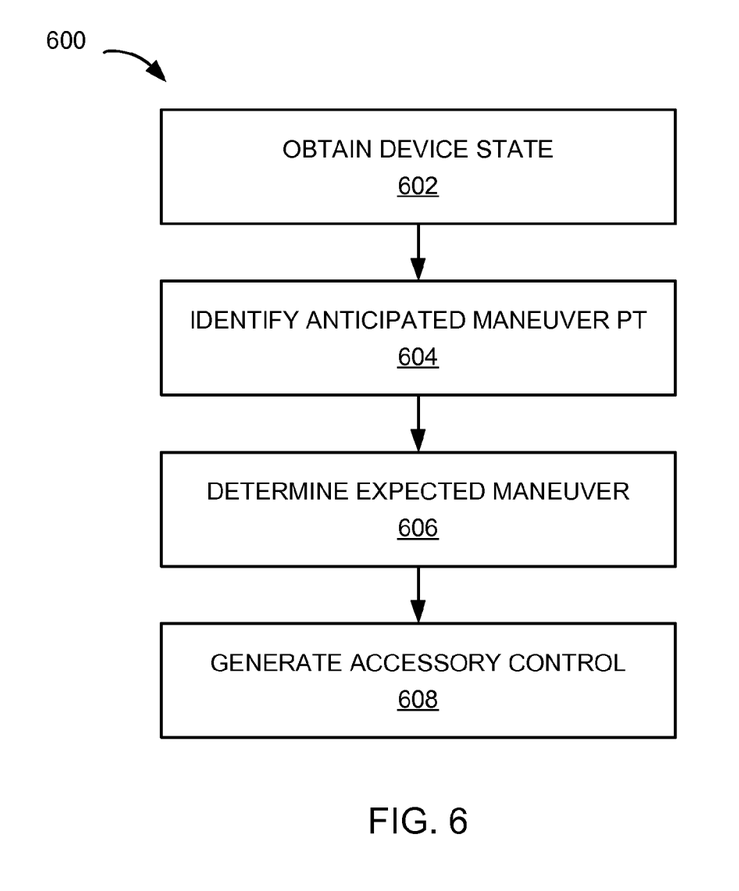
FIG. 6 is a flow chart of a method of operation of a navigation system in a further embodiment of the present invention.

Referring now to FIG. 6, therein is shown a flow chart of a method 600 of operation of a navigation system 100 in a further embodiment of the present invention. The method 600 includes: obtaining a device state having a current location, a current speed, and a current heading for locating a device in a block 602; identifying an anticipated maneuver point for estimating a future location of the device on a thoroughfare with the anticipated maneuver point calculated from the current location and the current heading in a block 604; determining an expected maneuver at the anticipated maneuver point in a block 606; and generating an accessory control for manipulating an accessory on the device for the expected maneuver at the anticipated maneuver point in a block 608.

The resulting system and method are straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   obtaining a state for representing a device, the state including a current location, a current speed, and a current heading for locating the device with a vehicle;
   identifying an anticipated maneuver point for estimating a future location of the device on a thoroughfare with the anticipated maneuver point calculated from the current location and the current heading;
   determining an expected maneuver at the anticipated maneuver point; and
   generating an accessory control for directing a camera on the vehicle for the expected maneuver at the anticipated maneuver point.

2. The method as claimed in claim 1 further comprising generating an overlay associated with the expected maneuver on the device.

3. The method as claimed in claim 1 wherein determining the expected maneuver includes:
   estimating an arrival at the anticipated maneuver point calculated with the current location and the current speed;
   identifying a further road segment connected to the anticipated maneuver point with a further current heading; and
   selecting the expected maneuver based on the further road segment.

4. The method as claimed in claim 1 further comprising:
   generating a planned route to a target destination for traversing the planned route with the device; and
   identifying the anticipated maneuver point on the planned route.

5. The method as claimed in claim 1 further comprising:
   generating a planned route to a target destination for traversing the planned route with the device;
   identifying the anticipated maneuver point on the planned route; and
   determining the expected maneuver at the anticipated maneuver point consistent with the planned route.

6. A method of operation of a navigation system comprising:
   obtaining a state for representing a device, the state including a current location, a current speed, and a current heading for locating the device with a vehicle;
   generating a planned route to a target destination for traversing the planned route with the device;
   identifying an anticipated maneuver point on the planned route for estimating a future location of the device on a thoroughfare, and calculated from the current location and the current heading;
   determining an expected maneuver at the anticipated maneuver point consistent with the planned route;
   generating an accessory control for directing a camera on the vehicle for the expected maneuver at the anticipated maneuver point; and
   generating an overlay associated with the expected maneuver on the device.

7. The method as claimed in claim 6 wherein identifying the anticipated maneuver point includes:
   identifying a road segment including the current location;
   identifying a shape point on the road segment in a direction of the current heading from the current location; and
   assigning the shape point as the anticipated maneuver point.

8. The method as claimed in claim 6 further comprising:
   obtaining a traffic condition associated with the road segment; and
wherein:
   determining the expected maneuver includes estimating an arrival at the anticipated maneuver point calculated with the current location, the current speed, and the traffic condition.

9. The method as claimed in claim 6 further comprising:
   determining the expected maneuver as a change in slope; and
wherein:
   manipulating the accessory control includes instructing the accessory to tilt vertically.

10. The method as claimed in claim 6 further comprising:
    determining the expected maneuver is a turn; and
wherein:
    generating the accessory control includes generating an instruction to swivel the accessory horizontally.

11. A navigation system comprising:
    a location module for obtaining a state for representing a device, the state including a current location, a current speed, and a current heading for locating the device with a vehicle;
    a next point module, coupled to the location module, for identifying an anticipated maneuver point for estimating a future location of the device on a thoroughfare with the anticipated maneuver point calculated from the current location and the current heading;
    a next action module, coupled to the next point module, for determining an expected maneuver at the anticipated maneuver point; and
    a manipulation module, coupled to the next action module, for generating an accessory control for directing a camera on the vehicle for the expected maneuver at the anticipated maneuver point.

12. The system as claimed in claim 11 further comprising a display module, coupled to the next action module, for generating an overlay associated with the expected maneuver on the device.

13. The system as claimed in claim 11 wherein the next action module is for estimating an arrival at the anticipated maneuver point calculated with the current location and the current speed, for identifying a further road segment connected to the anticipated maneuver point with a further current heading, and for selecting the expected maneuver based on the further road segment.

14. The system as claimed in claim 11 further comprising:
a navigation module, coupled to the next action module, for generating a planned route to a target destination for traversing the planned route with the device, and
wherein:
the next action module is for identifying the anticipated maneuver point on the planned route.

15. The system as claimed in claim 11 further comprising:
a navigation module, coupled to the next point module, for generating a planned route to a target destination for traversing the planned route with the device; and
wherein:
the next point module is for identifying the anticipated maneuver point on the planned route; and
the next action module is for determining the expected maneuver at the anticipated maneuver point consistent with the planned route.

16. The system as claimed in claim 11 further comprising:
a navigation module, coupled to the next point module, for generating a planned route to a target destination for traversing the planned route with the device;
a display module coupled to the next action module for generating an overlay associated with the expected maneuver on the device;
wherein:
the next point module is for identifying the anticipated maneuver point on the planned route; and
the next action module is for determining the expected maneuver at the anticipated maneuver point consistent with the planned route.

17. The system as claimed in claim 16 wherein the next point module is for identifying a road segment including the current location, for identifying a shape point on the road segment in a direction of the current heading from the current location, and for assigning the shape point as the anticipated maneuver point.

18. The system as claimed in claim 16 wherein:
the navigation module is for obtaining a traffic condition associated with the road segment; and
the next action module is for estimating an arrival at the anticipated maneuver point calculated with the current location, the current speed, and the traffic condition.

19. The system as claimed in claim 16 wherein:
the next action module is for determining the expected maneuver as a change in slope; and
the manipulation module is for instructing the accessory to tilt vertically.

20. The system as claimed in claim 16 wherein:
the next action module is for determining the expected maneuver is a turn; and
the manipulation module is for instructing the accessory to swivel horizontally.

* * * * *